United States Patent
Mitchell et al.

(10) Patent No.: US 10,623,166 B2
(45) Date of Patent: Apr. 14, 2020

(54) SYSTEMS AND METHODS FOR IMPROVED UPTIME FOR NETWORK DEVICES

(71) Applicant: T-Mobile USA, Inc., Bellevue, WA (US)

(72) Inventors: Michael Mitchell, Bellevue, WA (US); Peter P. Myron, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 206 days.

(21) Appl. No.: 15/248,527

(22) Filed: Aug. 26, 2016

(65) Prior Publication Data

US 2018/0062815 A1 Mar. 1, 2018

(51) Int. Cl.
| | |
|---|---|
| H04L 5/00 | (2006.01) |
| H04L 12/26 | (2006.01) |
| H04L 12/28 | (2006.01) |
| H04L 12/46 | (2006.01) |
| H04L 1/18 | (2006.01) |
| H04L 12/24 | (2006.01) |

(52) U.S. Cl.
CPC .............. *H04L 5/0055* (2013.01); *H04L 1/18* (2013.01); *H04L 12/28* (2013.01); *H04L 12/4625* (2013.01); *H04L 41/12* (2013.01); *H04L 43/0811* (2013.01); *H04L 43/10* (2013.01)

(58) Field of Classification Search
CPC ........ H04L 5/0055; H04L 41/12; H04L 43/10
USPC ......................................................... 709/223
See application file for complete search history.

(56) References Cited

U.S. PATENT DOCUMENTS

| | | | | |
|---|---|---|---|---|
| 5,892,928 A | * | 4/1999 | Wallach | ............... G06F 1/20 710/302 |
| 6,631,409 B1 | * | 10/2003 | Watson | ............... H04L 43/00 709/223 |
| 7,213,063 B2 | * | 5/2007 | Bressoud | ........... H04L 29/06 709/203 |
| 2003/0028827 A1 | * | 2/2003 | Gray | ............... G06F 11/0709 714/46 |

(Continued)

FOREIGN PATENT DOCUMENTS

| | | | | |
|---|---|---|---|---|
| EP | 1008859 A2 | * | 6/2000 | ......... G06F 11/2221 |
| EP | 2705429 B1 | | 7/2016 | |

OTHER PUBLICATIONS

PCT Search Report and Written Opinion dated Nov. 23, 2017 for PCT application No. PCT/US2017/046958, 13 pages.

*Primary Examiner* — Meng Vang
(74) *Attorney, Agent, or Firm* — Lee & Hayes, P.C.

(57) ABSTRACT

Systems and methods for remotely resetting networked devices is disclosed. The system can comprise a primary network connection and a secondary network connection to provide communications redundancy. The system can also include physical connections between networked devices to enable devices to be reset regardless of the type of error. The method can include monitoring one or more parameters of a device to determine what type of error is occurring and what action to take. The system can enable a first computer (or other electronic device) to restart applications, adapters, and services on a second computer (or other electronic device). The system can also enable the first computer to reset or restart the second computer. The system can enable networked computers to monitor and restore operation to other computers on the same network without human intervention.

20 Claims, 8 Drawing Sheets

(56) References Cited

U.S. PATENT DOCUMENTS

| | | | |
|---|---|---|---|
| 2004/0249613 A1* | 12/2004 | Sprogis | G06F 11/0748 |
| | | | 702/188 |
| 2008/0040628 A1* | 2/2008 | Mandal | H04L 41/0677 |
| | | | 714/4.1 |
| 2009/0319656 A1* | 12/2009 | Yang | H04L 41/065 |
| | | | 709/224 |
| 2010/0102631 A1 | 4/2010 | Chiou | |
| 2011/0219103 A1* | 9/2011 | Treadwell | G06F 21/554 |
| | | | 709/222 |
| 2014/0187199 A1 | 7/2014 | Yan et al. | |
| 2014/0192710 A1* | 7/2014 | Charette | H04L 45/22 |
| | | | 370/328 |
| 2015/0378743 A1 | 12/2015 | Zellermayer et al. | |
| 2016/0246692 A1* | 8/2016 | Kaplan | G06F 11/2007 |
| 2017/0004948 A1* | 1/2017 | Leyh | H01H 89/00 |

* cited by examiner

SYSTEMS AND METHODS FOR IMPROVED UPTIME FOR NETWORK DEVICES

BACKGROUND

Countless machines exist that are connected to one or more networks. Many computers are connected to an intranet, an extranet, and/or the Internet. These machines may be networked merely for communications purposes, or may be networked to work in concert with each other. Server banks exist, for example, in which multiple computers are networked together to form a single databank or to provide cloud computing services. Multiple machines may also be networked together to form test environments to enable new software or hardware components to be tested prior to widespread distribution.

The advent of home and cellular networks, such as 802.11x networks, has enabled countless additional devices to connect to home networks and the Internet, among other things. Thermostats, refrigerators, and televisions, for example, may all be network enabled to provide online content, fault diagnosis, and updates. Indeed, many new vehicles, such as the Tesla Model S, can be diagnosed and updated via a cellular data connection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
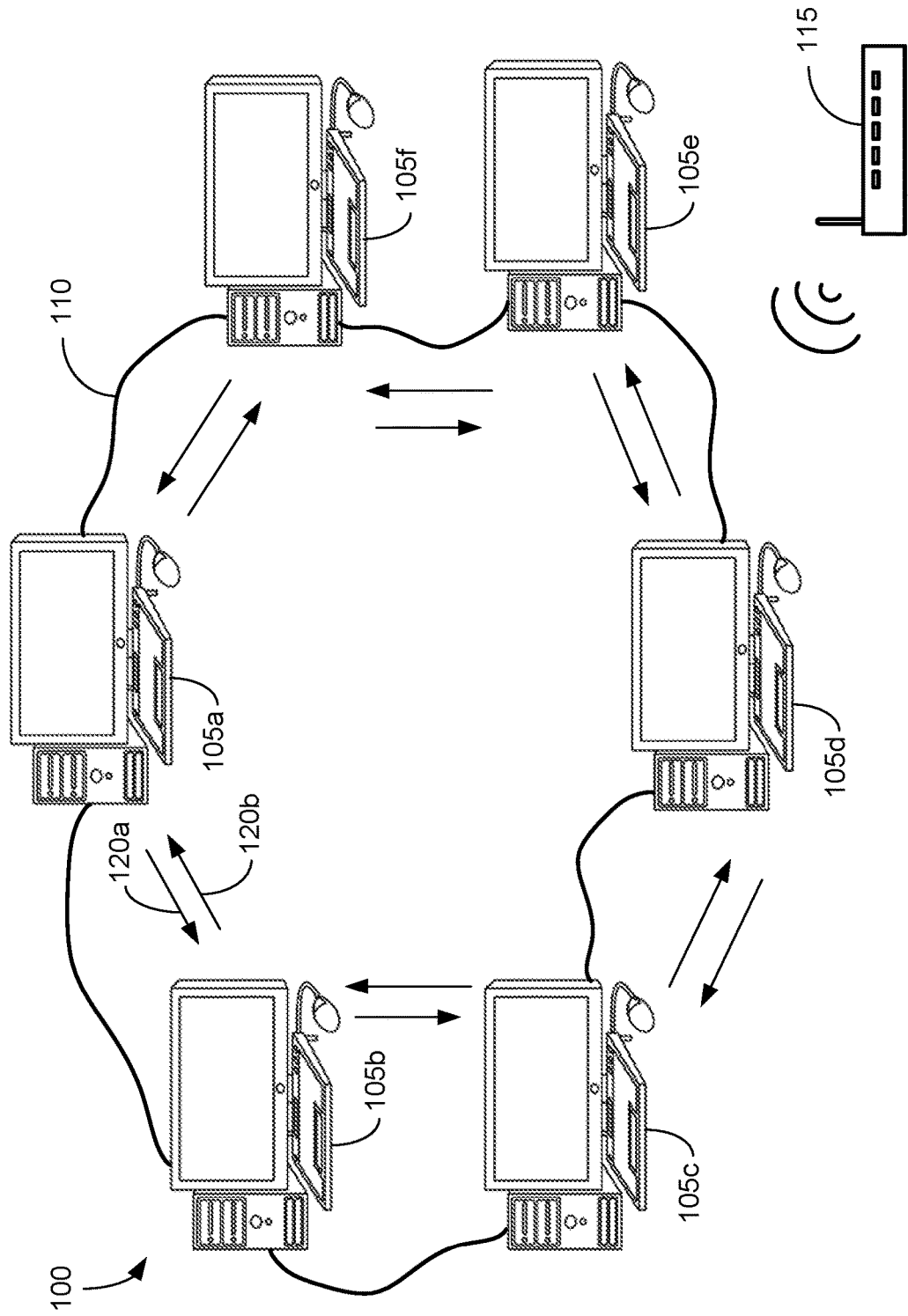
FIG. 1 is a schematic of a plurality of a ring topology, or "daisy-chain," of networked devices using a signal and response protocol to determine the health of the devices, in accordance with some examples of the present disclosure.

Examples of the present disclosure relate generally to systems and methods for resetting networked devices that have become inoperable and/or unreachable. The system can include a number of secondary communications channels and/or physical connections between networked devices. In some examples, multiple devices can be "daisy-chained" such that each device is responsible for the next device in the network. In other examples, multiple devices can each monitor multiple other devices, with each device individually capable of resetting one or all of the networked machines.

In some examples, the system can include a secondary communication channel, for example, to avoid a degraded or contested primary communication channel. In other examples, the system can utilize a physical connection to directly reset devices in the network. The system can enable a machine in a network to monitor one or more parameters of one or more other machines in the network and evaluate if a reset, restart, power cycle, or other action is necessary.

To simplify and clarify explanation, the disclosure is described herein as a system and method for analyzing, tracking, and fixing issues related to the processes and connectivity of networked electronic devices, and specifically "computers." One skilled in the art will recognize, however, that the disclosure is not so limited. The system can also be used, for example and not limitation, with other types of devices and machines with at least one form of communication. In addition, the disclosure provided below is related to current communications technologies, such as wireless networks (e.g., 802.11x), cellular technologies (e.g., 2G, 3G, 4G, and 4G LTE (Long Term Evolution)), and near-field communications (e.g., Bluetooth®) but is equally applicable to other network technologies, including technologies developed after this disclosure. In addition, while much of the disclosure describes actions or relationships between "a first electronic device" and "a second electronic device," this is not intended to imply a directional relationship or to exclude additional electronic device (e.g., "a third electronic device" or "a fourth electronic device") or any other network connected electronic devices such as, for example, computers, servers, cell phones, GPS receivers, or tablets. Indeed, the system could be used on many networked devices including, but not limited to, home automation, wearable devices, and other connected devices (e.g., the so-called internet of things (IoT)).

The metrics, methods, and steps described hereinafter as making up the various elements of the present disclosure are intended to be illustrative and not restrictive. Many suitable applications and networks that would perform the same or a similar function as the systems described herein are intended to be embraced within the scope of the disclosure. Such other systems and methods not described herein can include, but are not limited to, systems, networks, and technologies that are developed following the disclosure.

As discussed above, many electronic and electro-mechanical devices are now network enabled. As a result, these devices can communicate with other devices, with the Internet, and with support services. These devices may be able to provide error codes and other data to a support site, for example, and receive updates, configuration changes, or repairs (e.g., "patches") via the network connection.

Of course, it is common for many networked devices to become unreachable. This may be due to physically connectivity issues, for example, network adapter issues, or processor issues, among other things. An error in computer code or a virus, for example, can cause a processor, microprocessor, or memory to enter an infinite loop causing the device to become inoperable or unreachable. Similarly, network adapters (e.g., 802.11x adapters) can become disconnected due to conflicts (e.g. hostname, IP address, or port collisions) with other devices, among other things.

Regardless of the cause, when a device becomes disconnected from the network, it is no longer possible to remotely access the device. As a result, it is often necessary for a worker to physically reset the device. This can be achieved in some cases by restarting the device via the operating system (OS), but sometimes requires a "hard reset"—i.e., physically cycling the power of the device.

To this end, examples of the present disclosure can comprise systems and methods for monitoring, diagnosing, and resetting devices. The system can include a number of configurations to enable devices to monitor the parameters of one or more other devices to determine when a device needs to be reset. The system can utilize secondary communication channels, including additional physical connections, to remotely reset devices that have otherwise become uncommunicative or disabled.

As shown in FIG. 1, electronic devices 105 (e.g., computers, tablets, cell phones, and other electronic devices) are often networked in a test environment 100 (or indeed, in many environments) to enable software and hardware providers to test and refine new software or hardware components prior to their widespread release. In this manner, errors and incompatibilities can be identified and addresses in an isolated environment. If, for example, a new hardware or software component causes another existing hardware or software component to fail, then the incompatibility can be identified and resolved before the product is released. This reduces problems experienced at the consumer level, increasing customer satisfaction and reducing costs.

When these failures occur, it can be useful to reset a first electronic device 105a that has a problem to test whether the problem reoccurs or is an anomaly. If the first electronic device 105a has lost connectivity, however, or if the first electronic device 105a is "locked up," this can require a physical reset, or "hard reset," (often called a "reboot" as opposed to a "restart") of the first electronic device 105a first electronic device 105a to restore communications between the first electronic device 105a and the other electronic devices 105b-105f in the test environment 100. This requires the power button on the first electronic device 105a to be depressed, or the power to be interrupted, for a predetermined amount of time (e.g., 5 seconds) to cause the first electronic device 105a to power off. The power button must then be depressed a second time to cause the first electronic device 105a to reboot. It can be inconvenient and time consuming, however, for a worker to physically perform the reset operation, particularly if it happens at 2 AM or if the machine is located in a remote location.

In some examples, as shown, the electronic devices 105 can be configured in a "daisy-chain" configuration. Note that, while shown as a physical daisy chain, this configuration could also be achieved virtually (e.g., the electronic devices 105 can be arbitrarily assigned an address that achieves similar results as if the machines were physically connected sequentially." In such a topology, each electronic device 105 is responsible for the "next" device in the test environment 100. For example, a first electronic device 105a monitors a second electronic device 105b, the second electronic device 105b monitors a third electronic device 105c, and so on. In this manner, each electronic device 105 is responsible for one other electronic device 105 and each has one electronic device 105 responsible for it.

In some examples, the electronic devices 105 can utilize at least two communications channels. For example, electronic devices 105 can be connected via a hardwired Ethernet connection 110 (i.e., with Ethernet cables), and a wireless connection 115 (e.g., 802.11x). In this manner, if the first electronic device 105a becomes disconnected from one communication channel, (e.g., the Ethernet connection 110), the other electronic devices 105b-105f may nonetheless be able to communicate with the first electronic device 105a via the wireless connection 115, for example. In this configuration, a second electronic device 105b may be able to restart the Ethernet network adapter on the first electronic device 105a via wireless remote administration, rather than having to completely restart or power cycle the first electronic device 105a.

In this configuration, the first electronic device 105a can send a signal ("SIG") 120a to the second electronic device 105b via the Ethernet connection 110 to determine if the second electronic device 105b is operating normally. If the first electronic device 105a receives an acknowledgement ("ACK") 120b, then the first electronic device 105a has determined that the second electronic device 105b is operating properly and that the Ethernet connection 110 interface is functioning.

If, on the other hand, the first electronic device 105a does not receive the ACK 120b from the second electronic device 105b, the first electronic device 105a has determined that either (1) the Ethernet connection 110 is not functioning (2) the network adapter for the first electronic device 105a is not functioning or (3) the second electronic device 105b is not functioning in some manner.

Embodiments of the present disclosure, therefore, can comprise a method 200 for monitoring and resetting computers, and other electronic devices, when such communication disruptions occur. As mentioned above, electronic devices 105 can become uncommunicative for a variety of reasons. Computers can lose their network connections or adapters, they can become stuck in a loop causing the processor and/or memory to stop functioning, or they can be affected by viruses and other malware.

In many cases, simply restarting the offending network adapter, for example, can return the electronic device 105 to normal operation. In other examples, the electronic device 105 may need to be restarted via OS control mechanisms. In still other cases, such as when the processor and/or memory corruption have caused the OS to become non-responsive, the computer may need to be power cycled, or rebooted.

Figure 2A:
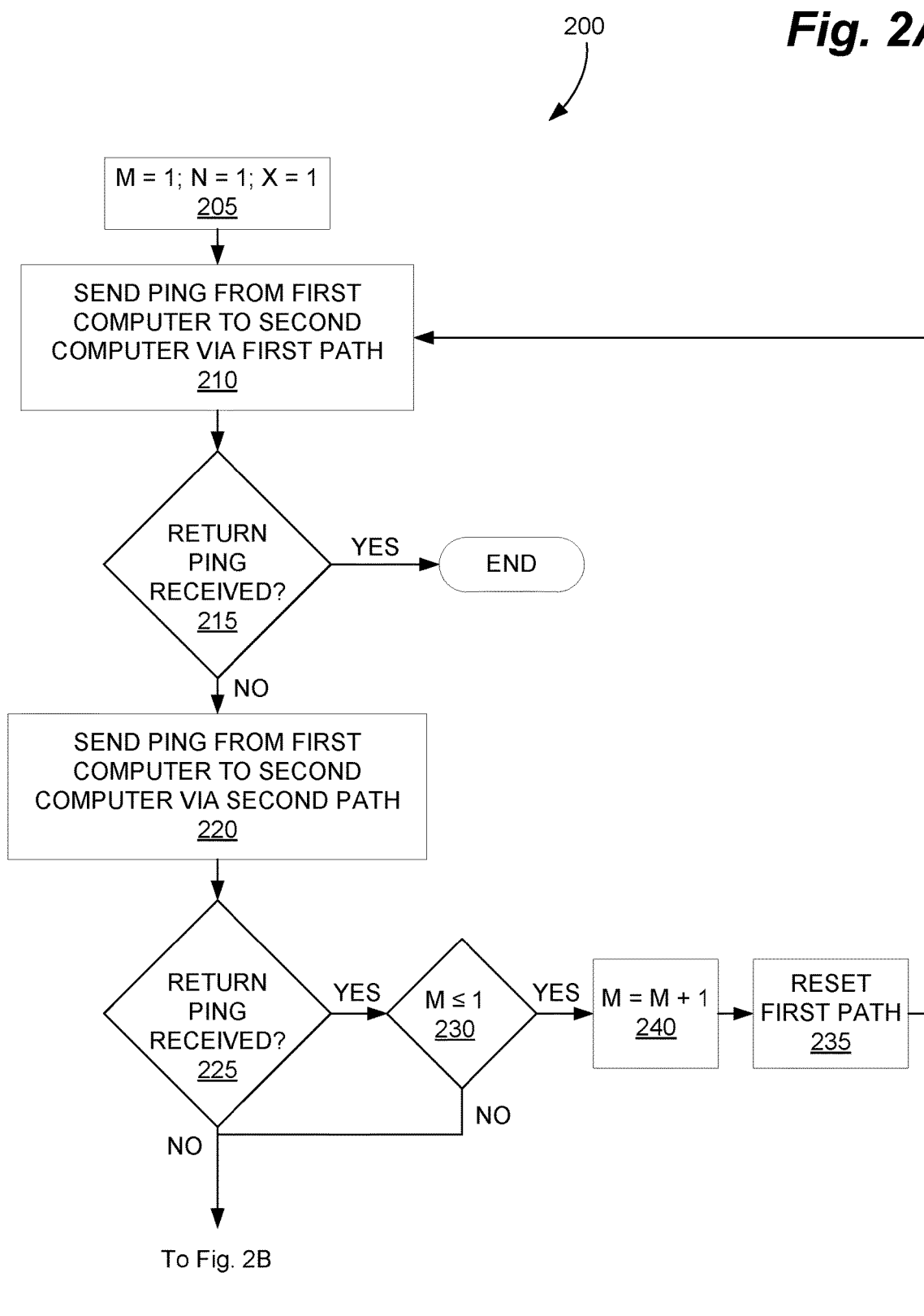
FIGS. 2A and 2B are flowcharts depicting a method for analyzing and restoring access to a device that has lost communications, in accordance with some examples of the present disclosure.
Figure 2B:
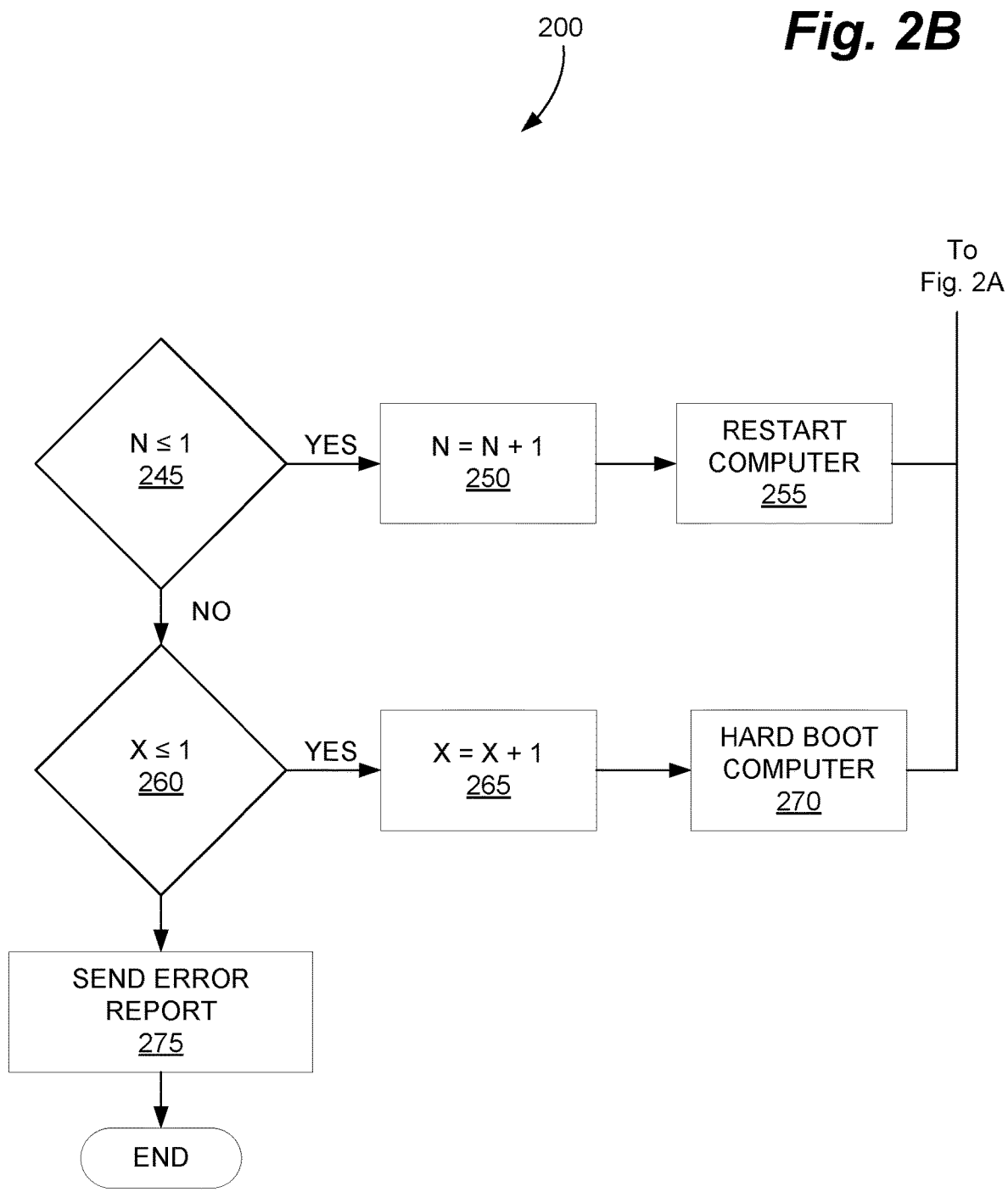

As shown in FIG. 2A, therefore, in order to prevent the method 200 itself from becoming stuck in a loop, at 205, the method 200 can begin by setting several counters to a value of 1. Each of the counters can be responsible for tracking the ever escalating corrective actions discussed below. To this end, M can be used to track the number of times a particular communications channel has been reset/restarted. Similarly, N can be used to track the number of times the second electronic device 105b has been restarted and X can track the number of times the second electronic device 105b has been rebooted. The counter can enable the method 200 to escalate its response based on the number of times the method 200 has attempted to resolve the problem using each type of response.

At 210, the first electronic device 105a can send a SIG 120a to the second electronic device 105b via a primary communication channel (e.g., Ethernet, wireless, or Bluetooth®) to determine if the second electronic device 105b is operating normally. At 215, the first electronic device 105a can determine whether an ACK120b was received from the second electronic device 105b. If an ACK120b was received, the method 200 ends and the second electronic device 105b is assumed to be operating properly. In other words, if the network adapter for the second electronic device 105b was down, the processor was locked up, or the memory was compromised in some way, for example, it is unlikely that the second electronic device 105b would respond properly to the SIG 120a. The method 200 can be set to repeat periodically (e.g., every 1, 5, or 10 minutes) or to initiate in response to a particular action or data point (e.g., an overheating processor, as discussed below).

At 220, if, on the other hand, the ACK 120b is not received from the second electronic device 105b, the first electronic device 105a can send a SIG 120a via a second communication channel. For example, if the first SIG 120a sent via the Ethernet connection 110 was not acknowledged, the second SIG 120a can be sent via the wireless connection 115, or vice-versa. Of course, the specific communications channels are somewhat irrelevant as long as they are sufficiently distinct in some way (e.g., use a different cable, different network adapter, and/or different communications protocol). So, the two connections could both be Ethernet connections 110, for example, as long as they use different cables, network adapters, and/or routers. Conversely, if both connections use the same cable and/or the same network adapter, then failure of one connection could also cause failure of another in the same way at the same time. Either of the connections could also comprise, for example, a cellular connection, Bluetooth® (or other near-field) connection, landline, or infrared connection.

At 225, the method 200 can determine if a second ACK 120b was received from the second electronic device 105b. As before, if the second ACK 120b is received, the first electronic device 105a can safely assume that the second electronic device 105b is operating properly with the exception of the primary communications channel disruption. The first communications channel disruption may be caused by hardware or software failure, physical medium disconnection, or any other service interruption. In some cases, however, simply stopping and restarting the network adapter, drivers, services, and/or processes associated with the first communication channel may resolve the issue and restore connectivity.

At 230, to ensure that the method 200 does not endlessly try to reset the first communication channel, the first electronic device 105a can check to see if M≤1—i.e., that the method 200 has not already tried resetting the first communication channel. If this is the first attempt, for example, M=1. At 235, the method can increase M by 1 (M=2). At 240, the first electronic device 105a can send a command to the second electronic device 105b to reset the network adapter for the first communications channel.

As mentioned above, the first electronic device 105a can send a command to the second electronic device 105b to restart the network adapter, services, and/or processes associated with the first communication channel (among other things). If the first communication channel used was the Ethernet connection 110, for example, the first electronic device 105a can tell the second electronic device 105b to restart its Ethernet adapter. The method 200 can then restart at 210 and recheck the first communications channel. At 215, if the return ACK 120b is now received via the first communications channel, then the issue has been resolved and the process ends. Because only the first communications channel was reset, the issue has been resolved without second electronic device 105b system restart or reboot, thus minimizing downtime and maintenance on the second electronic device 105b.

If the communications channel has already been reset (M≥2), at 245, the method 200 can determine if N≤1 (i.e., determine if the second electronic device 105b has already been restarted in an attempt to resolve the problem). If N≤1, at 250, the method can increase N by 1 (N=2). At 255, the first electronic device 105a can send a command to the second electronic device 105b to restart. As discussed below, in some examples, this can be achieved using a physical connection between the first electronic device 105a and the second electronic device 105b, a command to the OS of the second electronic device 105b, kernel or BIOS level instructions, etc. The method 200 can then return to enable the first electronic device 105a to resume connectivity checks with the second electronic device 105b. Restarting the computer, or other device, resolves a large portion of problems that these devices encounter. If a processor is caught in a loop, or an out of memory situation exists, for example, restarting the computer will—at least temporarily—resolve many of these issues.

At 260, if the method 200 has determined that the second electronic device 105b has already been restarted, the method 200 can then determine if the second electronic device 105b has been rebooted (i.e., if X≤1). At 265, if the method 200 determines that the second electronic device 105b has not yet been hard rebooted, X can be increased by 1 (X=2). At 270, the first electronic device 105a can send a command to reboot the second electronic device 105b. As discussed below, this can be accomplished with software or hardware, and may involve commands provided at the kernel level or physical control from an external electronic device, such as a relay or solenoid.

At 210, the method can return to recheck the connectivity between the first electronic device 105a and the second electronic device 105b. If the issue is resolved, the method 200 ends and periodic connectivity monitoring resumes. If, on the other hand, the issue is still not resolved, at 275, the first electronic device 105a can create and send an error report. The error report can be sent to IT personnel, for example, or logged in a central repository. In this case, however, when the error report is sent, the usual first steps—restarting the device interface (e.g., network adapter) that is not working, restarting the computer, or power cycling the computer—have all been completed. This automated process will resolve a vast majority of problems without any additional input. For those problems that cannot be resolved automatically, diagnosis is expedited because the technician knows that at least these preliminary steps have already been taken.

Of course, any part of the method 200 could be repeated more than once by simply changing the counter numbers (e.g., M, N, and X). For example, if it was desirable to try each solution—restarting the network adapter, restarting the computer, and rebooting the computer—twice, the threshold could simply be changed to M (or N or X)≤2. Indeed, any of the solutions could be performed any number of times by simply changing the threshold for each counter separately.

Of course, in some examples, a passive configuration could be used. In other words, rather than using the active communications between the electronic devices 105 described above, the electronic devices 105 could each monitor the communications channels 110, 115 for activity. If, for example, the first electronic device 105a detects no activity on the primary communications channel (e.g., the Ethernet connection 110), the first electronic device 105a can take a series of escalating steps, similar to those described above.

So, for example, if the first electronic device 105a detects no activity on the Ethernet connection 110, the first electronic device 105a can assume that either (1) it has a communication problem with at least its Ethernet connection or (2) the Ethernet connection itself is inoperative—i.e., it is unlikely that all of the electronic devices 105 would have a network adapter problem, for example, at the same time. In this situation, the first electronic device 105a can first try the escalating steps described above (e.g., restart adapter, restart, reboot) in an effort to resolve the issue. If this fails to resolve the issue, the first electronic device 105a can create and send an error report.

Again, the error report can be sent to IT personnel, for example, or logged in a central repository. In this case, however, when the error report is sent, the usual first steps—restarting the device interface (e.g., network adapter) that is not working, restarting the computer, or power cycling the computer—have all been completed. This automated process will resolve a vast majority of problems without any additional input. For those problems that cannot be resolved automatically, diagnosis is expedited because the technician knows that at least these preliminary steps have already been taken.

Figure 3:
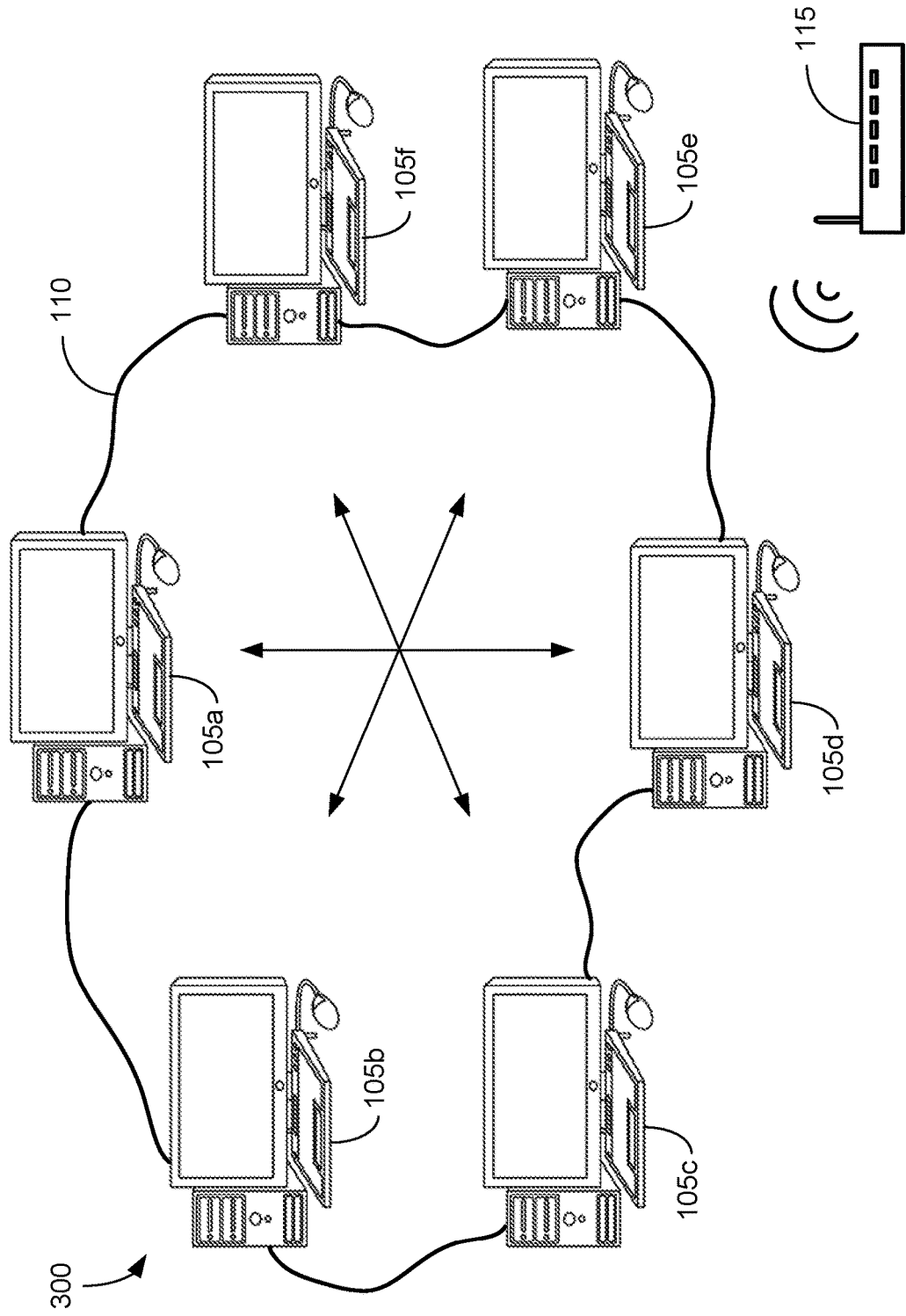
FIG. 3 is a schematic of a plurality of networked devices using a health signal and response signal to determine the health of the devices, in accordance with some examples of the present disclosure.

As shown in FIG. 3, in some examples, the system 300 can comprise a plurality of electronic devices 105 connected via one or more communications channels 110, 115 where each electronic device 105 is in bidirectional communication (i.e., each computer can send and receive data) with every other electronic device 105 in the system 300. In this configuration, every electronic device 105 can check on the health of every other electronic device 105. In addition, each electronic device 105 can also remotely control the other electronic devices 105 when problems occur, as discussed below.

Figure 4A:
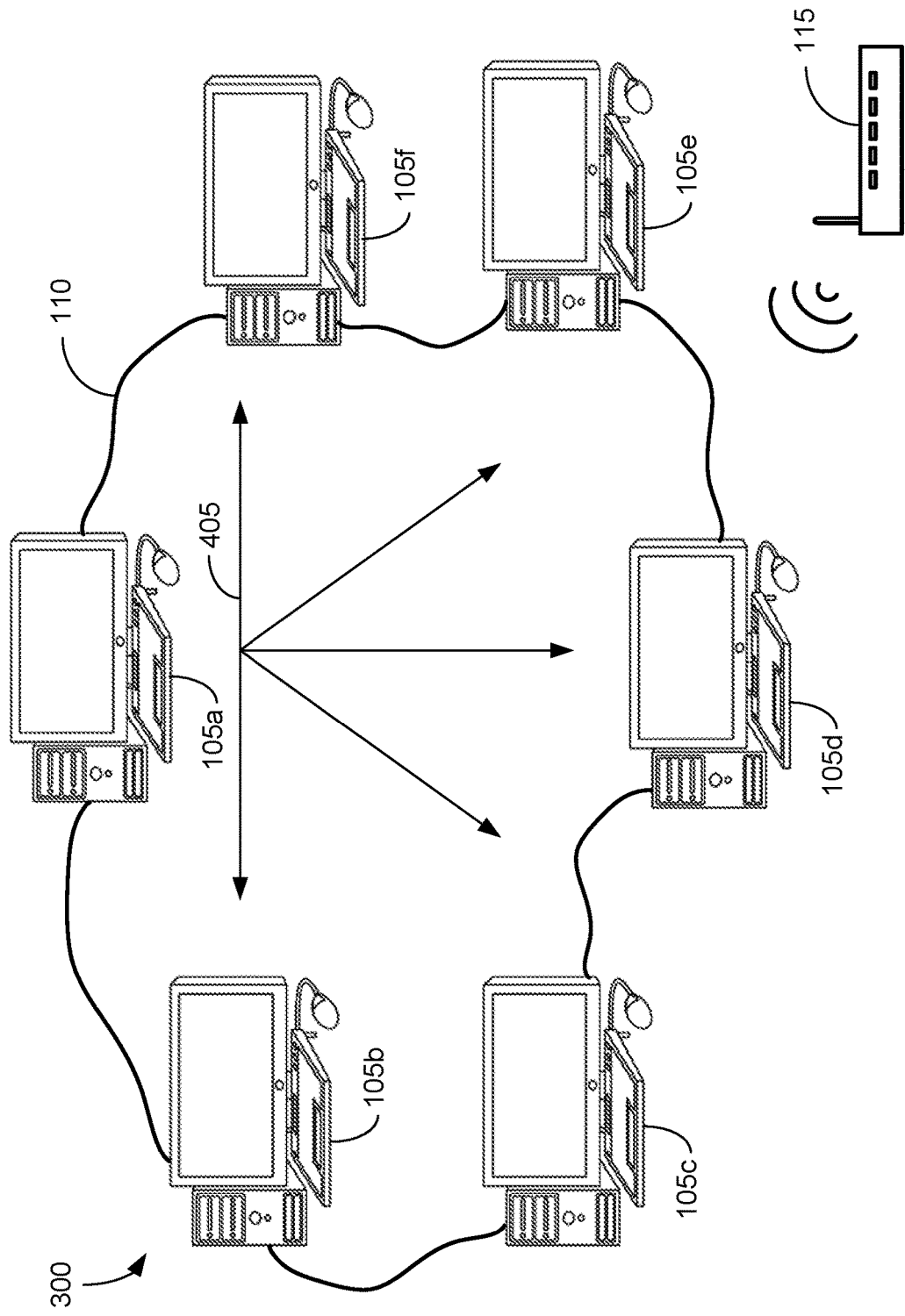
FIG. 4A is a schematic of a first electronic device sending a health signal to a plurality of electronic devices in communication with the first device, in accordance with some examples of the present disclosure.

As shown in FIG. 4A, in some examples, the first electronic device 105a can send the health signal 405 to the other electronic devices 105b-f. The health signal 405 can be a message, code, authentication key, token, or other communication to inform the other electronic devices 105b-f that the first electronic device 105a is operating properly. In other words, at the most basic level, if the first electronic device 105a is able to send the health signal 405, then the first electronic device 105a minimally has at least an operable network adapter, processor, and usable memory. Each electronic device 105 can periodically send the health signal 405 to all of the electronic devices 105 in the system 300.

Figure 4B:
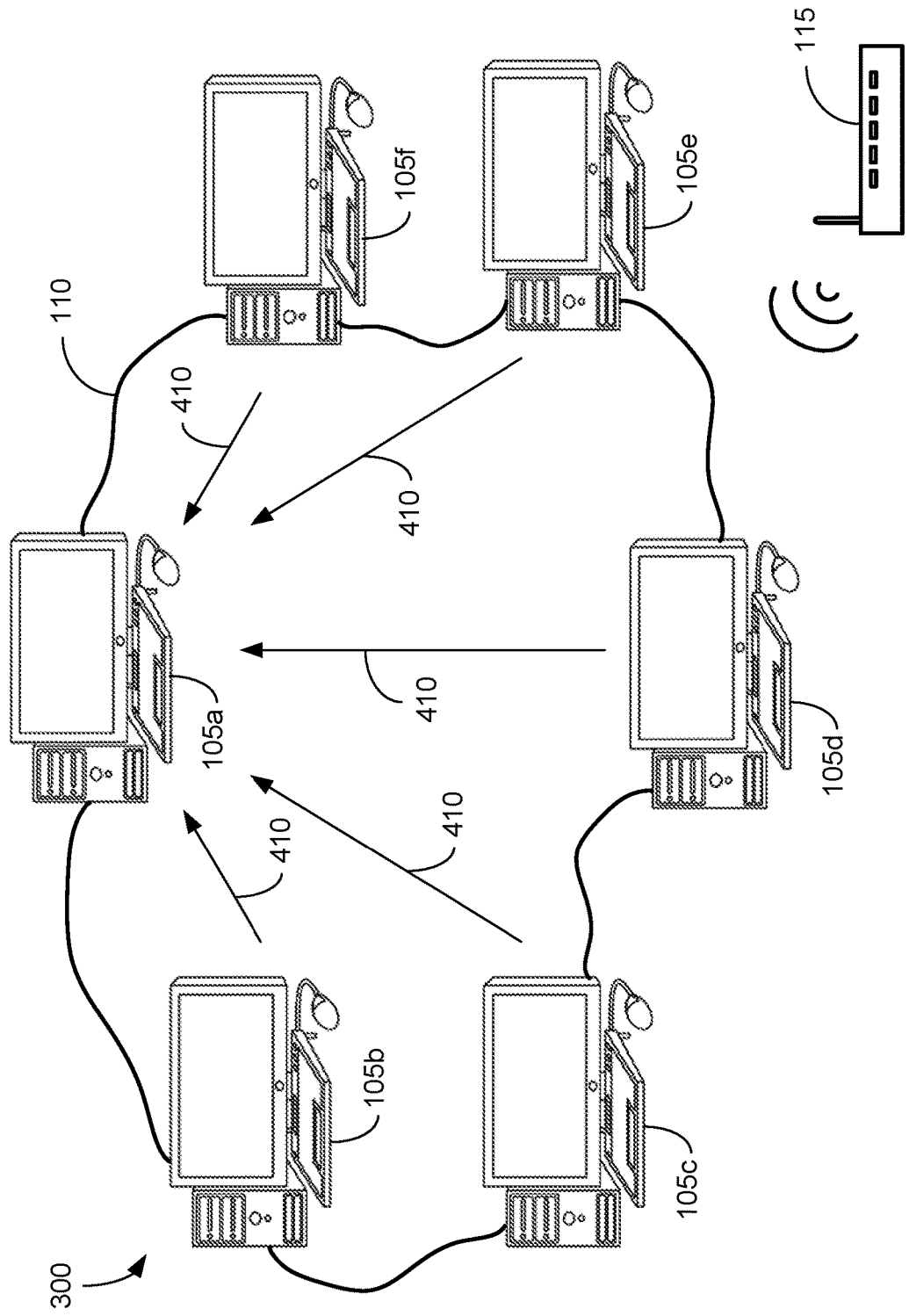
FIG. 4B is a schematic of the first electronic device receiving a response signal from the plurality of electronic devices in communication with the first electronic device, in accordance with some examples of the present disclosure.

As shown in FIG. 4B, after sending a health signal 405 from the first electronic device 105a, for example, the remaining electronic devices 105b-f can then send a "message received," or confirmation signal 410, to the first electronic device 105a. As with the health signal 405, the confirmation signal 410 can be a message, code, authentication key, token, or other communication that confirms that the other electronic devices 105b-f have received the health signal 405 from the first electronic device 105a.

This serves two purposes. The first is that it informs the first electronic device 105a that its network adapters are working properly. In other words, if the first electronic device 105a is able to both send and receive messages, it is clearly still connected to the system 300 with a functioning network adapter. Interestingly, and for the same reason, the confirmation signal 410 also informs the first electronic device 105a that the other electronic devices 105b-f are healthy (at least to the same extent). In this manner, if the first electronic device 105a does not receive a confirmation from a second electronic device 105b, for example, the first electronic device 105a can send a command to restart the network adapter on the second electronic device 105b, for example, or to restart or reboot the second electronic device 105b, or take other action. In some examples, the first electronic device 105a may wait until the second electronic device 105b misses a predetermined number (e.g., 2 or 3) of confirmation signals 410 (or health signals 405) to take action.

If, on the other hand, the first electronic device 105a does not receive any confirmation signals 410, the first electronic device 105a first electronic device 105a can assume, for example, that, at the least, it has a network adapter problem. As a result, the first electronic device 105a can take a number of escalating steps in an effort to correct the problem.

Initially, the first electronic device 105a can try restarting the active network adapter(s). In other words, if the Ethernet adapter for the first electronic device 105a has simply stopped working temporarily, then restarting just the network adapter may be sufficient to correct the problem. If this is ineffective, the first electronic device 105a can then escalate by restarting additional applications or services, and then finally to restart or reboot the system, if necessary. In some examples, as discussed below, the first electronic device 105a can consult a task manager, or similar application, to determine which applications or services may be experiencing issues.

In other examples, the first electronic device 105a can initially try a secondary connection channel to determine if the problem is related to the primary connection channel. So, if the first electronic device 105a was initially connected using the Ethernet connection 110, the first electronic device 105a can first try sending another health signal 405 via the wireless connection 115. If the first electronic device 105a then receives the confirmation signal 410 over the secondary wireless connection 115, the first electronic device 105a can initially restart the network adapter associated with the Ethernet connection 110 and resend the health signal 405 via the Ethernet connection 110. If the first electronic device 105a then receives the confirmation signal 410 over the primary Ethernet connection 110, the first electronic device 105a knows it has resolved the problem.

If, on the other hand, the first electronic device 105a does not receive the confirmation signal 410 via either the primary or secondary interface, the first electronic device 105a can then take a series of escalating steps to resolve the issue. In some examples, the first electronic device 105a can attempt to restart various services or processes using a task manager, or similar utility. After each attempt, the first electronic device 105a can send another health signal 405 to check for a confirmation signal 410. Ultimately, if no resolution is found, the first electronic device 105a can continue to escalate to system restart and then reboot, if necessary. Many, if not most, issues with electronic devices 105 can be resolved, at least temporarily, by restarting the electronic device 105.

Each of the electronic devices 105 can be programmed to send one or more health signals 405 at startup to ensure the electronic device 105 has properly started and that the network adapters, for example, are functioning properly. Each electronic device 105 can include a delay at startup, for example, to enable the network adapters and other services to start internally and on the other electronic devices 105. So, for example, the first electronic device 105a may not send out a first health signal 405 for a predetermined amount of time (e.g., 2 or 3 minutes) to prevent false positives caused by the first electronic device 105a or other electronic devices 105b-f starting up. In some examples, system uptime metrics can be utilized to further reduce false positives associated with system startup.

The health signal 405 enables the electronic device 105 to monitor its own health which reduces complexity and increases security. In other words, because the health signal 405 enables the electronic device 105 to essentially monitor itself, the commands associated with trying to resolve the problem can be made internally. This reduces the risks associated with providing access to sensitive areas of the electronic device 105 to external electronic devices 105 (e.g., the BIOS). Of course, if the processor or memory of the electronic device 105 is locked up, or the electronic device 105 is otherwise unable to send the health signal 405, redundant external methods can be provided. Indeed, in some examples, the electronic devices 105 can be part of a closed network, thus reducing or eliminating security concerns around remote access from external devices. In this case, each electronic device 105 may be granted administrative access to every other electronic device 105 to enable restarts and reboots to be initiated externally.

Figure 5A:
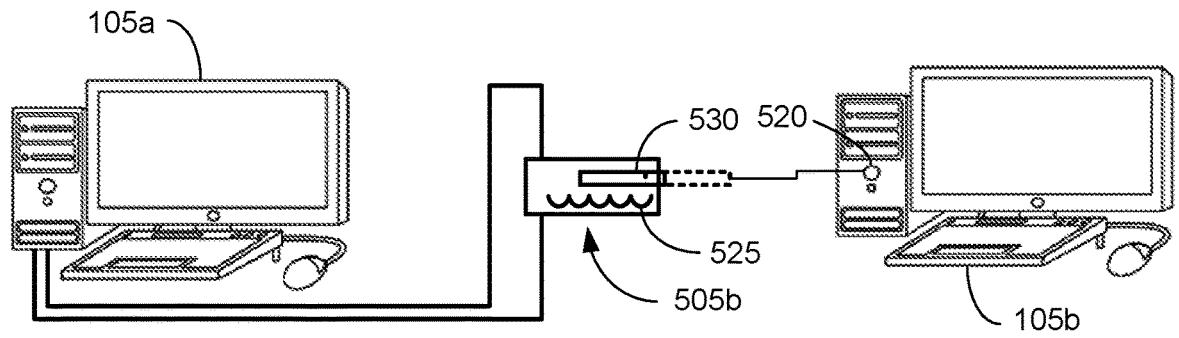
FIG. 5A is a schematic of the first electronic device in electrical communication with a second electronic device via a solenoid, in accordance with some examples of the present disclosure.
Figure 5B:
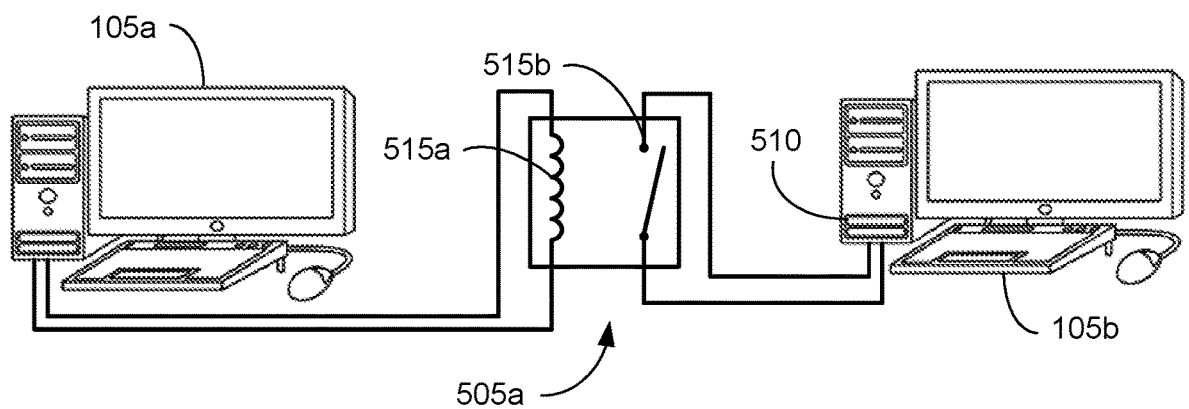
FIG. 5B is a schematic of the first electronic device in electrical communication with a second electronic device via a relay, in accordance with some examples of the present disclosure.

In some examples, as shown in FIGS. 5A and 5B, the system 500 can include a physical connection 505 between the electronic devices 105. In other words, the first electronic device 105a, for example, can be in communication with a device 505 that is physically connected to the second electronic device 105b. In the case where the second electronic device 105b is locked up due to memory, processor, or other issues, and can no longer receive software commands, the first electronic device 105a can restart or reboot (i.e., power cycle) the second electronic device 105b.

As shown in FIG. 5A, when all of the electronic devices 105 are in close proximity (e.g., in a test environment or server bank) or when additional security is desired, the physical connection 505 can comprise a solenoid 505b, or other mechanical or electro-mechanical device in physical communication with the second electronic device 105b. In some cases, the second electronic device 105b may require a power button 520, or other switch, to be physically activated (e.g., depressed) in order to restart or reboot. In some examples, depressing the power button 520 for a first predetermined amount of time (e.g., 1, 2, or 5 seconds) can enable the second electronic device 105b to restart, while depressing the power button 520 for a second, longer predetermined amount of time (e.g., 5, 10, or 20 seconds) can enable the second electronic device 105b to reboot.

To this end, in some examples, the first electronic device 105a can provide power to the coil 525 of the solenoid 505b to activate it. The solenoid 505b can comprise, for example, a push-pull solenoid or linear actuator positioned proximate to the power button 520 of the second electronic device 105b. When the first electronic device 105a detects a problem with the second electronic device 105b, for example, or does not receive a health signal 405 within a predetermined amount of time (e.g., within 1, 3, or 5 minutes), the first electronic device 105a can provide power to the solenoid 505b, causing the plunger 530 to move from a first, retracted position to a second, extended position, pushing the power button 520 on the second electronic device 105b. In some examples, the solenoid 505b can be mounted to the second electronic device 105b or to a bracket proximate the second electronic device 105b to provide access to the power button 520.

Providing physical access between the first electronic device 105a and the second electronic device 105b can enable the electronic devices 105 to restart and/or reboot without providing external administrative access to sensitive areas of the electronic device 105. In other words, the first electronic device 105a can restart and/or reboot the second electronic device 105b without access to the second electronic device's 105b OS, kernel of the OS, or the BIOS by simply pressing the power button 520. Using a solenoid 505b, or other physical device (e.g., linear actuator, pneumatic solenoid, etc.), enables this function to be accessed remotely, without intervention from the user. Thus, the second electronic device 105b can be restarted or rebooted by the first electronic device 105a despite the fact that the electronic devices 105 may be situated in different locations.

In other examples, as shown in FIG. 5B, the first electronic device 105a can be in electrical communication with a relay 505a connected to the power supply 510 of the second electronic device 105b. The relay 505a can be normally open (NO) or normally closed (NC). If the relay 505a is NO, the first electronic device 105a can provide a voltage source (e.g., 12 volts) to the coil 515a of the relay 505a to provide power at the output 515b of the relay 505a. Of course, the relay 505a could also be an electronic or solid state relay that requires only a small voltage source (e.g., 3.3 or 5 volts) to be activated. In this configuration, the first electronic device 105a can communicate with a microcontroller or other electronic device (e.g., Arduino or Raspberry Pi), to control the relay 505a. The relay 505a, in turn, provides power to the power supply 510 of the second electronic device 105b. If the first electronic device 105a does not receive a health signal 405 from the second electronic device 105b, for example, the first electronic device 105a can remove the electrical signal from the coil 515 of the relay 505a, disconnecting the power supply 510 of the second electronic device 105b. After a predetermined amount of time (e.g., 10, 20, or 30 seconds), the first electronic device 105a can reapply the electrical signal to the coil 515, powering the second electronic device 105b back on.

If the relay 505a is NC, on the other hand, the second electronic device 105b receives power from the relay 505a in the normal case. If the predetermined failure criteria are met and other resolution methods unsuccessful, the first electronic device 105a provides power to the coil 515 of the relay 505a, which interrupts the power to the power supply 510 on the second electronic device 105b. In this manner, power is only required momentarily at the coil 515 to disconnect it, meaning that the relay 505a is "off," or not energized the majority of the time. This can reduce energy consumption and heat buildup and increase the life of the relay 505a, among other things.

In some examples, all of the electronic devices 105 may be part of a closed, secure environment. In a test environment, for example, the electronic devices 105 may be linked by two or more physical or electronic connections, but isolated from other networks and computers. For example, the electronic devices 105 may be linked by an Ethernet cable and a Bluetooth® connection within a test environment. The electronic devices 105 may be networked with each other, but without contact to other computers or external networks (e.g., the Internet or an intranet). In this configuration, due to limited external security threats, each electronic device 105 can be given BIOS or kernel level access, for example, to at least one other electronic device 105. second electronic device 105b In this configuration, if the first electronic device 105a detects a problem with the second electronic device 105b, the first electronic device 105a can simply send a command to restart, reboot, or to restart and then reboot. Because the first electronic device 105a has low-level administrative access (e.g., at the kernel or BIOS level), the second electronic device 105b simply receives the command to restart or reboot as if the system call, key sequence (e.g.

control-alt-delete buttons), or the power button, respectively, had been depressed. In other words, to the second electronic device 105b, there is no difference between receiving these commands from the first electronic device 105a via the Ethernet connection and the commands being directly input on the second electronic device 105b(e.g., with keyboard inputs or buttons physically activated).

Of course, other electrical, electro-mechanical, or computer-based solutions could be used for remote control. In some examples, a microcontroller, such as an Arduino or Raspberry Pi could be used to communicate with the electronic devices 105 and to control one or more relays 505a or solenoids 505b, as discussed above. In other examples, the first electronic device 105a could be a server responsible for the other electronic devices 105b-f. In this configuration, the first electronic device 105a could monitor all of the other electronic devices 105b-f, for example, and the first electronic device 105a could be monitored by a single worker to centralize the monitoring process.

Figure 6:
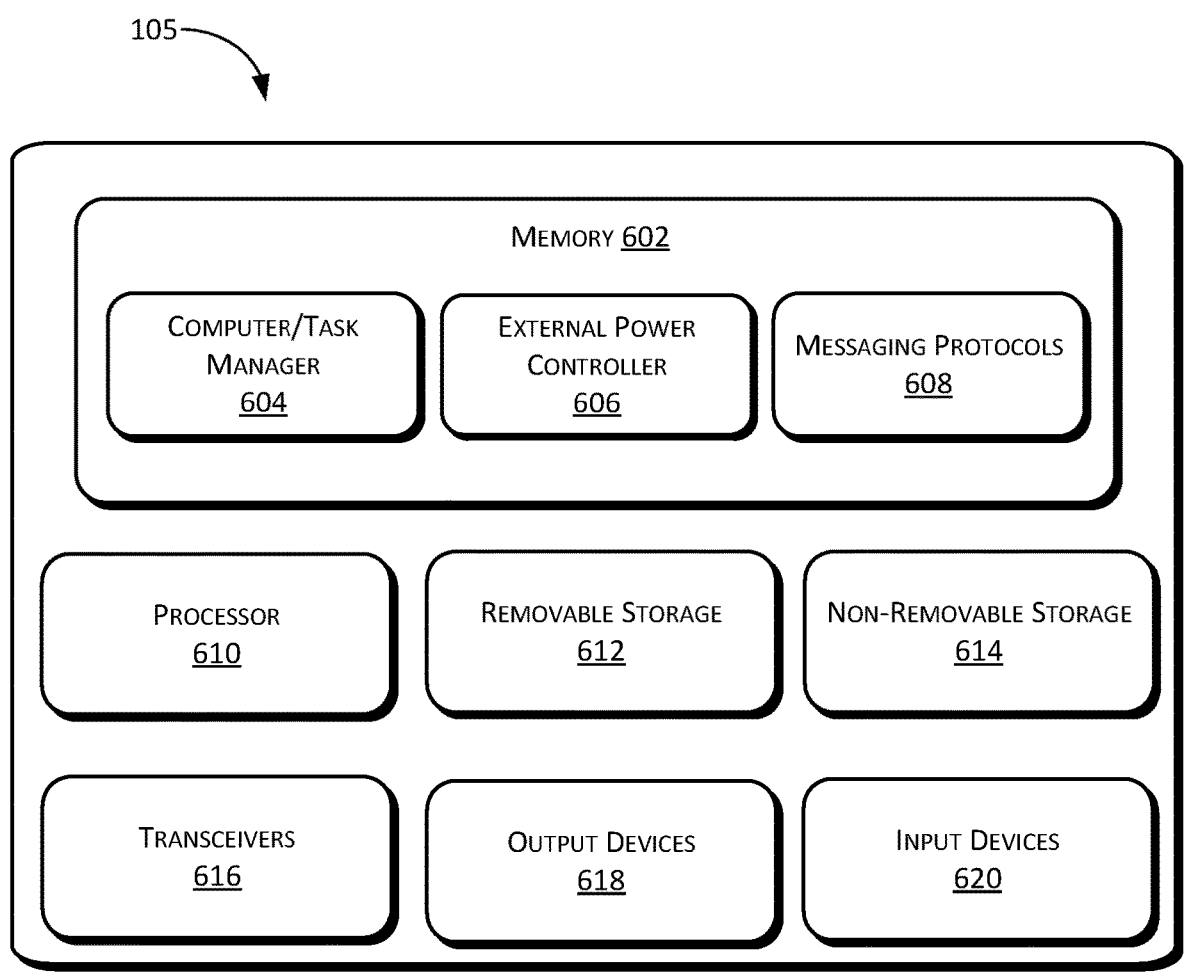
FIG. 6 is a component level schematic for the plurality of devices in the system, in accordance with some examples of the present disclosure.

As shown in FIG. 6, the networked electronic devices 105 can comprise a number of components to enable each electronic device 105 to monitor and control at least one other electronic device 105 in the network. As discussed below, each electronic device 105 can comprise memory 602 configured to include at least a task manager 604, an external power control module 606, and one or more messaging protocols 608. Also, each electronic device 105 can include one or more processor(s) 610, removable storage 612, non-removable storage 614, transceivers 616, output device(s) 618, and input device(s) 620. The electronic devices 105 may additionally contain a policy engine to receive, create, transmit, and manage the various messages and commands.

In various implementations, the memory 602 can be volatile (such as RAM), non-volatile (such as ROM, flash memory, etc.), or some combination of the two. The memory 602 can also comprise a computer and/or task manager 604 similar to, or the same as, those found in the OS. In some examples, the task manager 604 can enable the electronic device 105 to monitor the performance of at least one other electronic device 105 in the network. In some examples, the task manager 604 can monitor processor 610 usage to detect abnormal or suspicious usage patterns. If, for example, the first electronic device 105a detects a prolonged period in which the processor 610 of the second computer is at a predetermined level of utilization (e.g., 80-100%), the first electronic device 105a can restart or reboot the second electronic device 105b. Similarly, if the second electronic device 105b has prolonged periods of higher than normal memory usage at a predetermined level (e.g., 80-100%), then the first electronic device 105a can restart or reboot the second electronic device 105b. In some examples, the task manager 604 can detect which application or process is causing higher than normal processor or memory usage and stop or restart the offending application or process.

In some examples, regardless of the actual memory or processor usage, the first electronic device 105a can detect that the processor or memory usage for the second electronic device 105b is simply higher than normal. In other words, if the processor normally operates around 30% and the memory around 20% usage, for example, then a prolonged spike above, for example, 60% and 40% (e.g., double), respectively, could indicate a problem. In some examples, the first electronic device 105a could also utilize additional hardware sensors to detect abnormal conditions (e.g. excessively high processor temperatures) in the second electronic device 105b for this purpose. In some examples, the first electronic device 105a can further comprise an algorithm to detect abnormal resource usage in the second electronic device 105b.

In some examples, the memory 602 can also include an external power control module 606. As discussed above, the external power control 606 can enable each computer to restart or reboot at least one other electronic device 105 in the network. In some examples, the external power control module 606 can apply or remove a power signal to a relay 505a or solenoid 505b, for example, to directly control the power of another electronic device 105. In other examples, the power control module 606 can send a command from the first electronic device 105a to the second electronic device 105b at the OS, kernel, or BIOS level to cause the second electronic device 105b to restart or reboot.

In some examples, the memory 602 can also comprise a messaging protocol module 608. As discussed above, rather than directly monitoring each electronic device 105, the electronic devices 105 can instead rely on messages, tokens, or signals 120 to provide status reports. For example, the first electronic device 105a can send a SIG 120a to the second electronic device 105b and the second electronic device 105b can respond with an ACK120b. In other examples, each electronic device 105 can be responsible for the next electronic device 105 in a daisy-chain style configuration. As discussed above, each electronic device 105 can restart components (e.g., network adapters), services, or applications for at least one other electronic device 105 in an attempt to restore functionality for a malfunctioning computer without outside (e.g., human) intervention.

In other examples, the messaging protocol module 608 can involve sending a health signal 405 from the first electronic device 105a to the remaining electronic devices 105b-f. In response, each of the remaining electronic devices 105b-f can send a confirmation signal 410 back to the first electronic device 105a. In this case, the messaging protocol module 608 can dictate what action is to be taken when an electronic device 105 fails to respond to a health signal 405 appropriately. In some examples, the messaging protocol module 608 can dictate that the first electronic device 105a act after a predetermined number (e.g., 1, 2, or 5) of missed confirmation signals 410 from the second electronic device 105b. In some examples, the messaging protocol module 608 can dictate that the first computer 105a act after a predetermined number (e.g., 1, 2, or 5) of missed health signals 405 from the second computer 105b In some examples, the action taken may vary based on which type of signal 405, 410 is missing. In other words, if the second electronic device 105b is sending health signals 405, but not confirmation signals 410, this may indicate that the second electronic device 105b has a network adapter problem allowing it to transmit, but not receive, communications. In this case, the first electronic device 105a may first restart the network adapter for the second electronic device 105b, or try another communication channel. If, on the other hand, the second electronic device 105b is not sending health signals 405 or confirmation signals 410, the second electronic device 105b may require a network adapter reset or, if fully non-responsive, a restart or reboot. In this case, the first electronic device 105a can first restart the network adapter for the second electronic device 105b and then escalate as necessary.

In some implementations, the processor(s) 610 can comprise a central processing unit (CPU), a graphics processing unit (GPU), or both a CPU and a GPU, or any other sort of processing unit. The processor 610 can be responsible for monitoring, messaging or performance from other electronic devices 105 and taking action, as discussed above. In some examples, the processor 610 can monitor the performance of various components, such as the processor 610 and memory 602, of at least one other computer in the network. In other examples, the processor 610 can depend on the aforementioned messaging protocol module 608 to take action.

Each electronic device 105 may also include additional data storage devices (removable and/or non-removable) such as, for example, magnetic disks, optical disks, or tape. Such additional storage is illustrated in FIG. 6 by removable storage 612 and non-removable storage 614. The removable storage 612 and non-removable storage 614 can store the various programs and algorithms for the monitoring and/or messaging process and can include routines for restarting applications or services on other electronic devices 105 in the system or restarting or rebooting the electronic devices 105.

Non-transitory computer-readable media may include volatile and nonvolatile, removable and non-removable tangible, physical media implemented in technology for storage of information, such as computer readable instructions, data structures, program modules, or other data. The memory 602, removable storage 612, and non-removable storage 614 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the electronic device 105. Any such non-transitory computer-readable media may be part of the electronic device 105 or may be a separate database or databank.

In some implementations, the transceivers 616 include any sort of transceivers known in the art. For example, the transceivers 616 may include wired communication components, such as a wired modem or Ethernet port, for communicating with the other electronic device 105 in the network. Also or instead, the transceivers 616 may include modem(s) or other hardware to facilitate wireless connectivity with the other electronic devices 105, the Internet, and/or other networks. Further, the transceivers 616 may include a radio transceiver that performs the function of transmitting and receiving radio frequency communications via an antenna (e.g., WiFi or Bluetooth®). In some examples, the transceivers 616 can utilize two or more communication protocols to enable the first electronic device 105a multiple communication channels to the second electronic device 105b. This can enable the first electronic device 105a to determine if, for example, one transceiver 616 is functioning (e.g., Ethernet), but another is not (e.g., Wi-Fi).

In some examples, the electronic devices 105 can be located in a test environment and can be part of a wired and/or wireless network. In other examples, the electronic devices 105 can be remotely located at, for example, a remote server bank, or a cloud storage facility. In other examples, the electronic devices 105 can simply be multiple users in disparate locations connected via the Internet, a virtual private network (VPN), or other communications network. Each electronic device 105 can be in communications with, and can control at least one aspect (e.g., hardware, software, power, etc.) of at least one other electronic device 105.

In some implementations, the output devices 618 include any sort of output devices known in the art, such as a display (e.g., a liquid crystal display), a touchscreen display, speakers, a vibrating mechanism, or a tactile feedback mechanism to provide an interactive representation of system state to the user. In some examples, the output devices can play various sounds based, for example, on whether an electronic device 105 in the system appears to be malfunctioning or is out of contact. Output devices 618 also include ports for one or more peripheral devices, such as headphones, peripheral speakers, or a peripheral display.

In various implementations, input devices 620 include any sort of input devices known in the art. For example, input devices 620 may include a camera, a microphone, a keyboard/keypad, or a touch-sensitive display. A keyboard/keypad may be a standard push button alphanumeric, multi-key keyboard (such as a conventional QWERTY keyboard), a touchscreen, joystick, or other input device. In some examples, the input devices 620 can also include communications ports on the first electronic device 105a to enable at least one other electronic device 105 access such that it can restart applications or services and restart and/or reboot the first electronic device 105a (e.g., kernel level access).

While several possible examples are disclosed above, examples of the present disclosure are not so limited. For instance, while systems and methods for use with computers has been disclosed, other electronic devices could be analyzed, diagnosed, and controlled in a similar manner without departing from the spirit of the disclosure. In addition, the location and configuration used for various features of examples of the present disclosure such as, for example, the order of steps, the types of physical controls, and the components of each electronic device 105 can be varied according to a particular network or application that requires a slight variation due to, for example, the size or construction of the network, the communication protocols, or the computers or other devices used. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
  sending a first signal ("SIG") from a first electronic device to a second electronic device via a first communication channel;
  determining that a first acknowledgement ("ACK") was not received from the second electronic device via the first communication channel in response to the first SIG;
  sending a second SIG from the first electronic device to the second electronic device via a second communication channel;
  determining that a second ACK was received from the second electronic device at the first electronic device in response to the second SIG;
  in response to determining that the first ACK was not received and that the second ACK was received, determining that a failure of an element of the second electronic device may be preventing the second electronic device from communicating over the first communication channel; and sending, from the first electronic device via the second communication channel to an operating system (OS) of the second electronic device, a command to restart a network adapter of the second electronic device that is associated with the first communication channel without completely restarting or hard rebooting the second electronic device.

2. The method of claim 1, further comprising:

in response to sending the command to restart the network adapter of the second electronic device that is associated with the first communication channel, sending a third SIG from the first electronic device to the second electronic device via the first communication channel; and determining that a third ACK was received from the second electronic device at the first electronic device in response to the third SIG.

3. The method of claim 1, further comprising:

in response to sending the command to restart the network adapter of the second electronic device that is associated with the first communication channel, sending a third SIG from the first electronic device to the second electronic device via the first communication channel;

determining that a third ACK was not received from the second electronic device at the first electronic device in response to the third SIG; and in response to determining that the third ACK was not received, sending a second command from the first electronic device, wherein the second command initiates:

a restart of the second electronic device via OS mechanisms of the second electronic device, or a hard reboot of the second electronic device via power cycling the second electronic device.

4. The method of claim 3, wherein the second command is sent to a kernel level of the OS of the second electronic device, and wherein the second command is sent from the first electronic device to the second electronic device via the second communication channel.

5. The method of claim 3, wherein the second command is sent from the first electronic device to an external electronic device configured to physically cause the restart or the hard reboot of the second electronic device upon receipt of the second command.

6. The method of claim 5, wherein the external electronic device comprises a solenoid configured to, upon receipt of the second command, cause a plunger to physically activate a physical control of the second electronic device that causes the restart or the hard reboot of the second electronic device.

7. The method of claim 5, wherein the external electronic device comprises a relay configured to provide power to the second electronic device, and wherein the relay, upon receipt of the second command, causes the hard reboot of the second electronic device via the power cycling by temporarily interrupting the power provided to the second electronic device.

8. A method comprising:

sending a health signal from a first electronic device to a plurality of electronic devices via a first communication channel, wherein the health signal attempts to inform the plurality of electronic devices that the first electronic device is operating properly;

determining that a confirmation signal is not received from at least a second electronic device of the plurality of electronic devices at the first electronic device in response to the health signal; and in response to determining that the confirmation signal is not received from at least the second electronic device, taking one or more actions with the first electronic device to restore communications with at least the second electronic device via the first communication channel, wherein the first electronic device and the plurality of electronic devices are arranged in a daisy-chained test environment such that the first electronic device and the plurality of electronic devices are networked together using at least the first communication channel and a second communication channel, but are isolated from external networks.

9. The method of claim 8, wherein taking one or more actions with the first electronic device comprises sending a command from the first electronic device via the second communication channel to the second electronic device to restart a network adapter of the second electronic device that is associated with the first communication channel, without completely restarting or hard rebooting the second electronic device.

10. The method of claim 9, further comprising:

in response to sending the command to restart the network adapter of the second electronic device that is associated with the first communication channel, sending a second health signal to the plurality of electronic devices via the first communication channel;

determining that a second confirmation signal is not received from the second electronic device in response to the second health signal; and in response to determining that the second confirmation signal is not received from the second electronic device, sending a second command from the first electronic device, wherein the second command initiates:

a restart of the second electronic device via operating system mechanisms of the second electronic device, or a hard reboot of the second electronic device via power cycling the second electronic device.

11. The method of claim 10, wherein the second command is sent from the first electronic device to an external electronic device having a relay that is configured, upon receipt of the second command, to physically cause the hard reboot of the second electronic device via the power cycling by temporarily removing an electrical signal from the second electronic device to cause the second electronic device to reboot.

12. The method of claim 10, wherein the second command is sent from the first electronic device to an external electronic device having a solenoid that is configured, upon receipt of the second command, to cause a plunger to physically activate a physical control of the second electronic device that causes the restart or the hard reboot of the second electronic device.

13. The method of claim 8, wherein taking one or more actions with the first electronic device comprises sending a command from the first electronic device that initiates:

a restart of the second electronic device via operating system mechanisms of the second electronic device, or a hard reboot of the second electronic device via power cycling the second electronic device.

14. The method of claim 8, wherein the confirmation signal is not received from any of the plurality of electronic devices; and wherein taking one or more actions with the first electronic device comprises restarting a network adapter on the first electronic device that is associated with the first communication channel in response to determining that the confirmation signal is not received from any of the plurality of electronic devices in response to the health signal, without completely restarting or hard rebooting the first electronic device.

15. The method of claim 8, wherein the confirmation signal is not received from any of the plurality of electronic devices; and wherein taking one or more actions with the first electronic device comprises, in response to determining that the confirmation signal is not received from any of the plurality of electronic devices in response to the health signal, performing:
- a restart of the first electronic device via operating system mechanisms of the first electronic device, or
- a hard reboot of the first electronic device via power cycling the second electronic device.

16. A method comprising:

sending a signal ("SIG") from a first electronic device to a second electronic device via a first communication channel;

determining that an acknowledgement ("ACK") was not received from the second electronic device via the first communication channel in response to the SIG;

in response to determining that the ACK was not received, determining that a failure of an element of the second electronic device may be preventing the second electronic device from communicating over the first communication channel; and sending a command from the first electronic device, wherein the command initiates:
- a restart of the second electronic device via operating system mechanisms of the second electronic device, or
- a hard reboot of the second electronic device via power cycling the second electronic device, wherein the first electronic device and the second electronic device are part of a plurality of electronic devices arranged in a daisy-chained test environment such that the plurality of electronic devices are networked together using at least the first communication channel and a second communication channel, but are isolated from external networks.

17. The method of claim 16, wherein the command is sent to a kernel level of an operating system of the second electronic device, and wherein the command is sent from the first electronic device to the second electronic device via the second communication channel.

18. The method of claim 16, wherein the command is sent from the first electronic device to an external electronic device configured to physically cause the restart or the hard reboot of the second electronic device upon receipt of the command.

19. The method of claim 18, wherein the external electronic device comprises a solenoid configured to, upon receipt of the command, cause a plunger to physically activate a physical control of the second electronic device that causes the restart or the hard reboot of the second electronic device.

20. The method of claim 18, wherein the external electronic device comprises a relay configured to provide power to the second electronic device, and wherein the relay, upon receipt of the command, causes the hard reboot of the second electronic device via the power cycling by temporarily interrupting the power provided to the second electronic device.

* * * * *